Sept. 17, 1963 F. WOLFF 3,104,281
APPARATUS FOR EFFECTING THE AUTOMATIC CONTRAST
CONTROL IN TELEVISION RECEIVERS
Filed Sept. 30, 1960 2 Sheets-Sheet 1

INVENTOR
F. WOLFF
BY C. H. Suydam
AGENT

Sept. 17, 1963 F. WOLFF 3,104,281

APPARATUS FOR EFFECTING THE AUTOMATIC CONTRAST CONTROL IN TELEVISION RECEIVERS

Filed Sept. 30, 1960 2 Sheets-Sheet 2

INVENTOR

F. WOLFF

BY C. H. Suydam

AGENT

United States Patent Office 3,104,281
Patented Sept. 17, 1963

3,104,281

APPARATUS FOR EFFECTING THE AUTOMATIC CONTRAST CONTROL IN TELEVISION RECEIVERS

Friedrich Wolff, Pforzheim, Germany, assignor to International Standard Electric Corporation, New York, N.Y., a corporation of Delaware Filed Sept. 30, 1960, Ser. No. 59,622
Claims priority, application Germany Sept. 30, 1959
10 Claims. (Cl. 178—7.5)

Figure 1:
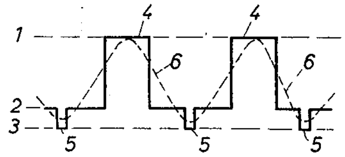

This invention relates to apparatus for effecting the automatic contrast control in television receivers, in which components corresponding to the picture information (image content) are evaluated in such a way that the contrast is reduced by large white areas in the picture scenes.

Generally, television receivers are equipped with an automatic gain control for compensating field-intensity differences. In addition thereto television receivers are provided with manual controls for controlling the contrast as well as the brightness, with the aid of which the viewing person can adjust the TV-receiver in accordance with his own taste. Furthermore, television receivers are known in which the contrast and/or the brightness are controlled in accordance with the ambient or room brightness by way of a light sensitive circuit element (e.g. photo-resistance cell).

In a copending application of A. Rappold, Serial No. 19,071, filed March 31, 1960, entitled "Method of Effecting the Automatic Contrast Control in Television Receivers," assigned to the same assignee as the present application, a circuit arrangement is disclosed in which both the picture vertical scanning frequency and the line scanning frequency are filtered out of the picture spectrum to derive therefrom a control voltage to reduce the contrast in the presence of large quantities of these frequencies in the image reproduced by the TV-receiver—that is, in the case of large white areas containing the basic components (German Standard) of 50 cs. and 15 kc./s. This circuit arrangement abolishes the necessity of having to readjust the contrast by hand in the case of extreme changes in scenery as well as in the case of a different black/white content.

It has been found under certain circumstances that a faulty control phenomenon can occur in the circuit arrangement of the above cited copending application. For example, if a person in a white dress moves from one side to the other on the screen in front of a dark background a strong control is effected although a controlling or readjustment of the contrast is not at all desired since the black and white content of the picture has not changed. This unwanted control is obtained due to variations in the amplitude of the 15 kc./s.-component filtered from the picture spectrum which is directly related to the position of the image content relative to the line synchronizing signals. In the same way a faulty control is effected whenever a person dressed in a dark suit moves in front of a bright background. In this case it is even likely that a 30 kc./s.-component is formed. Of course, these phenomena could be eliminated with the aid of additional switching manipulations in the production of the control voltage. This, however, would cause the circuit arrangement to become more expensive.

The present invention retains the advantage of the above cited copending application while avoiding the faulty control phenomena thereof. This is accomplished by rectifying the picture signal to obtain a control voltage which is used in such a way for contrast-control purposes that the contrast is reduced in proportion to the white-level value.

The contrast control arrangement of this invention which is dependent on the picture information (image content) may be coupled with a contrast and brightness control which is dependent upon the ambient brightness in the room in which the television picture is being viewed.

Figure 5:
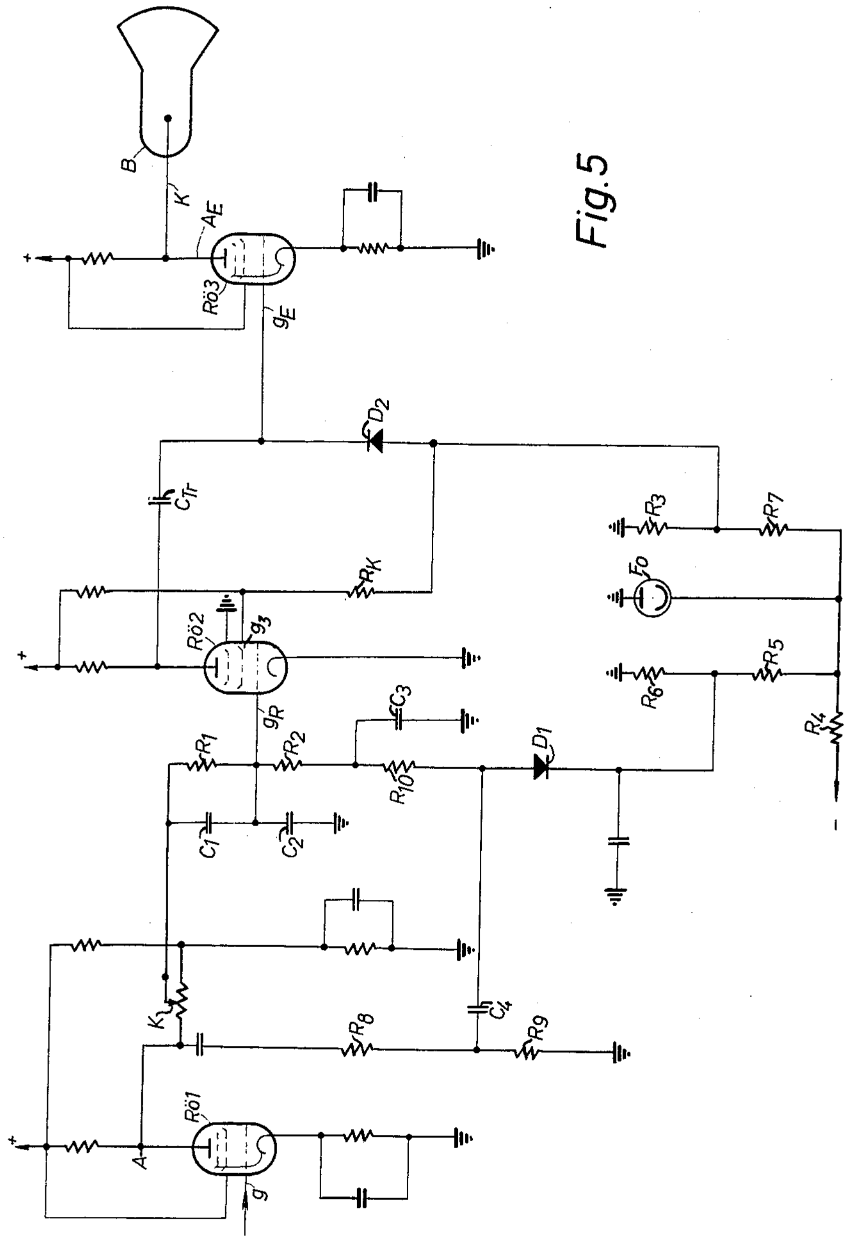

In the following the invention will now be described in particular with reference to FIGS. 1–5 of the accompanying drawings, in which:

FIGS. 1–4 are diagrams illustrating how faulty control signals result in the arrangement of the above cited copending application; and FIG. 5 illustrates a schematic diagram of an embodiment following the principles of the present invention.

FIGS. 1–4 show how, under certain conditions, difficulties arise in the circuit arrangement of the copending application wherein both the picture frequency and the line frequency is filtered out of the picture spectrum in order to derive therefrom a control voltage for contrast-control purpose. The contrast is reduced in the presence of large portions or quantities of the basic components in the picture (for example, large white-level values with the basic components 50 cs. and 15 kc./s.).

It is assumed that a person dressed in white moves from one side to the other in front of a dark background. In the arrangement of the copending application this would cause a strong control or readjustment although a contrast control is not at all desired since the relationship between the black and the white portions of the picture information remains unchanged. The reason for this faulty control operation is to be found in the existence of the line-synchronizing signals and of the line-blanking gap at a distance of 15 kc./s.

Figure 2:
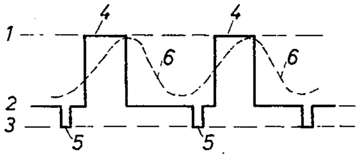
Figure 3:
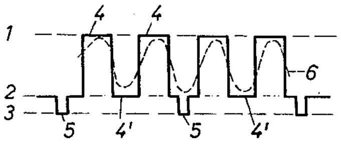
Figure 4:
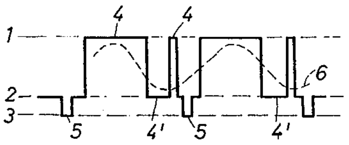

FIGS. 1 and 2 show the generation of the control voltage for the contrast-control purpose with respect to the assumed case, that is, white picture information in front of a dark background. FIG. 1 relates to the case in which a person dressed in white is positioned approximately in the center of the picture. Line 1 indicates the white-level value, line 2 indicates the black-level value of the video signal, and line 3 indicates the synchronizing level. If the person in white is positioned in about the center of the picture, then the white-level value of the picture information is centered in relation to the line-synchronizing signals 5, or the blanking gap, as illustrated in FIG. 1. The basic component, that is, the 15 kc./s.-component, has an amplitude approximately as indicated by curve 6. This basic component, therefore, is filtered out to a greater extent and results in a more intensified control or readjustment.

If the person now moves towards one of the sides of the picture, then the position of the white picture portion is no longer located in the center of or synchronously related to the line-synchronizing signals, but rather is towards the left or the right, for example, as shown in FIG. 2. The resultant 15 kc./s.-component will have a different amplitude and is naturally filtered out to a correspondingly smaller extent but will result in a slight control or readjustment without any change in the relationship between the content of the black and the white picture portions.

The faulty control operations are even more noticeable if, for example, a person dressed in black moves in front of a white background. If this person is positioned in the center of the picture (cf. black picture portion 4′ in FIG. 3), then no components of 15 kc./s. is present at all, but a component of 30 kc./s. (curve 6) is present which has an adding effect upon the contrast control. If this person now moves towards one side of the picture (FIG. 4), then a control is effected. In such cases it would be advisable to use in addition to the 15 kc./s.-component the 30 kc./s.-component of the picture information for producing the control voltage. This however, would also cause the circuit arrangement to become more expensive.

According to the present invention, therefore, a circuit arrangement is proposed which employs no circuit elements tuned to certain frequencies and, consequently, is much more simple and inexpensive in its construction and requires no balancing of the frequency-determining circuit elements.

Via a capacitor the video signal is fed to a diode across which a control voltage is produced corresponding to the white-level value of the picture information (image content). This control voltage is then smoothed by the action of filter circuits and used for effecting the controlling or regulating process.

One embodiment of the invention which has been tested in practice is shown in FIG. 5. In this circuit arrangement the contrast control which is a function of the picture information (content) is combined with a contrast and brightness control which is dependent upon the room brightness.

In this embodiment the video signal is coupled from the video detector (not shown) to grid $g$ of the first video amplifier stage $Rö_1$. The video signal is coupled from anode A of the first video stage $Rö_1$ by means of a coupling capacitor to produce a control signal for controlling the contrast in dependency upon the picture information. This video signal is unaffected by the manual contrast control K. Via a voltage divider $R_8$, $R_9$, and a capacitor $C_4$ this video signal is fed to a rectifier $D_1$. In this rectifier a control voltage is produced which corresponds to the white-level value of the picture information and is fed via the filter circuit $R_{10}$, $C_3$ as a direct-current component to the grid $g_R$ of the control tube $Rö_2$. This direct-current component is an average of the white-level value of the picture information occurring in successive rasters, that is, at the frame frequency. By this kind of control or regulation it is ensured that in the case of large-surface white components in the picture the contrast is reduced in the desired manner. For example, with the aid of the rectifier, a control voltage of, e.g., about 9 volts is produced by a white picture and a control voltage of, e.g., about 3 volts is produced by a black picture. Therefore, in this circuit arrangement a variation of gain is effected by the factor 2.5. In addition, this way of obtaining the control voltage bears the added advantage that modulation variations of the transmitter, which might be due to parts of the evening television news program which were taken under unfavourable light conditions, are extensively compensated provided that the black-level value of the picture information approximately corresponds to TV-standards and is not already lying within the medium grey.

In the exemplified circuit arrangement the control voltage which is a function of the picture information or content has been added to the control voltage as produced by the ambient brightness in the room in which the television picture is being viewed. The latter is derived from a negative auxiliary voltage by means of the voltage divider $R_4$ and the photo-resistance cell $F_0$ and is fed via the resistors $R_5$, $R_6$ to the grid $g_R$ of the control tube $Rö_2$ for effecting a contrast variation. In addition thereto this voltage is fed via the resistors $R_7$, $R_3$ to the pedestal resistor of the black-value control diode $D_2$ for effecting the correction of brightness.

The video signal coupled from contrast control K is reduced via a capacitive and ohmic voltage divider $R_1$, $R_2$, $C_1$, $C_2$, to, e.g., one-twentieth of its value, and is fed to the grid $g_R$ of the control tube $Rö_2$. By this voltage division the curvature of the tube characteristic will not have any influence upon the gradation of the signal. Via a coupling-capacitor (stripper) $C_{Tr}$ the signal is applied to the grid $g_E$ of the video output stage $Rö_3$. The usual black-level control diode $D_2$ is connected to the grid $g_E$ of this output stage. The anode $A_E$ of the output stage $Rö_3$ is directly connected with the cathode K of the picture tube B. The variation of the black-level value at the pedestal or the black-level control diode, which is due to the gain variation, is compensated by a voltage divider $R_K$ of the screen grid $g_3$ of the control tube $Rö_2$ to the pedestal resistor of the pedestal or the black-level control diode $D_2$.

The practical application of the idea of the invention is in no way restricted to the given exemplified circuit arrangement only.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. An automatic contrast control for television receivers comprising:
   - a source of video signal;
   - a picture tube to display a representation of said video signal;
   - control means coupled to the output of said source and the input of said picture tube;
   - means coupled to the output of said source to produce a control voltage proportional to the white-level value of said video signal; and
   - means coupling said control voltage to said control means to control the contrast of said video signal.

2. An automatic contrast control for television receivers comprising:
   - a source of video signal;
   - a rectifier means coupled to the output of said source to produce a control voltage proportional to the white-level value of said video signal; and
   - means coupled to the output of said source responsive to said control voltage to control the contrast of said video signal.

3. An automatic contrast control for television receivers comprising:
   - a source of video signal;
   - a picture tube to display a representation of said video signal;
   - a control means coupled to the output of said source and the input of said picture tube;
   - means coupled to the output of said source to produce a first control voltage proportional to the white-level value of said video signal;
   - means responsive to the ambient light in the viewing area to produce a second control voltage proportional to the intensity of said ambient light; and
   - means coupling said first and second control voltages to said control means to control the contrast of said video signal.

4. An automatic contrast control for television receivers comprising:
   - a source of video signal;
   - rectifier means coupled to the output of said source to produce a first control voltage proportional to the white-level value of said video signal;
   - means responsive to the ambient light in the viewing area to produce a second control voltage proportional to the intensity of said ambient light; and
   - means coupled to the output of said source responsive to said first and second control voltages to control the contrast of said video signal.

5. An automatic contrast control for television receivers comprising:
   - a source of video signal;
   - a picture tube to display a representation of said video signal;
   - a first control means coupled to the output of said source;
   - a second control means coupled to the output of said first control means and the input of said picture tube;
   - means coupled to the output of said source to produce a first control voltage proportional to the white-level value of said video signal;

means responsive to the ambient light in the viewing area to produce a second control voltage proportional to the intensity of said ambient light;

means coupling said first and second control voltages to said first control means to control the contrast of said video signal; and means coupling said second control voltage to said second control means to control the brightness of said video signal.

6. An automatic contrast control for television receivers comprising:

a source of video signal;

rectifier means coupled to the output of said source to produce a first control voltage proportional to the white-level value of said video signal;

means responsive to the ambient light in the viewing area to produce a second control voltage proportional to the intensity of said ambient light;

first control means coupled to the output of said source responsive to said first and second control voltages to control the contrast of said video signal; and second control means coupled to the output of said first control means responsive to said second control voltage to control the brightness of said video signal.

7. An automatic contrast control for television receivers comprising:

a source of video signal;

a picture tube to display a representation of said video signal;

an amplifier coupled to the output of said source and the input of said picture tube;

means coupled to the output of said source to produce a control voltage proportional to the white-level value of said video signal; and means coupling said control voltage to said amplifier to control the gain thereof for control of the contrast of said video signal.

8. An automatic contrast control for television receivers comprising:

a source of video signal;

a picture tube to display a representation of said video signal;

an amplifier coupled to the output of said source and the input of said picture tube;

means coupled to the output of said source to produce a first control voltage proportional to the white-level value of said video signal;

means responsive to the ambient light in the viewing area to produce a second control voltage proportional to the intensity of said ambient light; and means coupling said first and second control voltages to said amplifier to control the gain thereof for control of the contrast of said video signal.

9. An automatic contrast control for television receivers comprising:

a source of video signal;

a picture tube to display a representation of said video signal;

a first amplifier coupled to the output of said source;

a second amplifier coupled to the output of said first amplifier and the input of said picture tube;

means coupled to the output of said source to produce a first control voltage proportional to the white-level value of said video signal;

means responsive to the ambient light in the viewing area to produce a second control voltage proportional to the intensity of said ambient light;

means coupling said first and second control voltages to said first amplifier to control the gain thereof for control of the contrast of said video signal; and means coupled to said second amplifier responsive to said second control voltage to control the brightness of said video signal.

10. An automatic contrast control for television receivers comprising:

a source of video signal;

a picture tube to display a representation of said video signal;

a first amplifier coupled to the output of said source;

a second amplifier coupled to the output of said first amplifier and the input of said picture tube;

means coupled to the output of said source to produce a first control voltage proportional to the white-level value of said video signal;

means responsive to the ambient light in the viewing area to produce a second control voltage proportional to the intensity of said ambient light;

means coupling said first and second control voltages to said first amplifier to control the gain thereof for control of the contrast of said video signal; and means coupled to the input of said second amplifier responsive to the black-level value of said video signal and to said second control voltage to control the brightness of said video signal.

References Cited in the file of this patent

UNITED STATES PATENTS

| | | |
|---|---|---|
| 2,264,172 | Batchelor | Nov. 25, 1941 |
| 2,310,671 | Batchelor | Feb. 9, 1943 |
| 2,703,341 | Clark | Mar. 1, 1955 |
| 2,865,991 | Risner | Dec. 23, 1958 |
| 2,885,472 | Billin | May 5, 1959 |
| 2,937,235 | Hoyt | May 17, 1960 |
| 3,027,421 | Hejligers | Mar. 27, 1962 |

FOREIGN PATENTS

| | | |
|---|---|---|
| 1,076,736 | Germany | Mar. 3, 1960 |

OTHER REFERENCES

German application (Auslegeschrift) 1,073,535, Jan. 21, 1960.